United States Patent
Iwamoto et al.

(10) Patent No.: US 7,911,632 B2
(45) Date of Patent: Mar. 22, 2011

(54) IMAGE FORMATION APPARATUS AND IMAGE FORMATION SYSTEM

(75) Inventors: Hiroshi Iwamoto, Toyohashi (JP); Eiichi Yoshida, Toyokawa (JP); Shoji Imaizumi, Shinshiro (JP); Hiroshi Sugiura, Hoi-gun (JP); Masaaki Saka, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1240 days.

(21) Appl. No.: 11/016,998

(22) Filed: Dec. 21, 2004

(65) Prior Publication Data

US 2006/0087681 A1 Apr. 27, 2006

(30) Foreign Application Priority Data

Oct. 25, 2004 (JP) ................ P2004-309515

(51) Int. Cl.
 *G06F 3/12* (2006.01)
 *G06K 15/00* (2006.01)
(52) U.S. Cl. ............ 358/1.15; 358/1.16; 358/1.13; 358/1.2; 358/403; 358/448; 715/853; 715/854; 715/855
(58) Field of Classification Search ............ 358/1.16, 358/1.13, 1.15, 403, 448, 1.2
 See application file for complete search history.

(56) References Cited

U.S. PATENT DOCUMENTS

| | | | | |
|---|---|---|---|---|
| 6,894,792 B1 * | 5/2005 | Abe | ................... | 358/1.15 |
| 7,304,753 B1 * | 12/2007 | Richter et al. | ............ | 358/1.15 |
| 2002/0030851 A1 * | 3/2002 | Wanda | ............... | 358/1.15 |
| 2002/0075510 A1 * | 6/2002 | Martinez | ............... | 358/1.15 |
| 2003/0159114 A1 * | 8/2003 | Nishikawa et al. | ......... | 715/530 |
| 2004/0156070 A1 * | 8/2004 | Gassho | ............... | 358/1.14 |

FOREIGN PATENT DOCUMENTS

| | | |
|---|---|---|
| JP | 6168085 | 6/1994 |
| JP | 8163332 | 6/1996 |
| JP | 2002137500 | 5/2002 |
| JP | 2004-220148 A | 8/2004 |
| JP | 2004-242120 A | 8/2004 |

OTHER PUBLICATIONS

Japan Patent Office Action dated Jan. 30, 2006.

* cited by examiner

*Primary Examiner* — Mark K Zimmerman
*Assistant Examiner* — Huo Long Chen
(74) *Attorney, Agent, or Firm* — Buchanan Ingersoll & Rooney PC (57) ABSTRACT

An image formation apparatus includes: a job input unit receiving job inputs of performing image formation from image data; a job registration unit registering the jobs of performing image formation from the image data together with priorities in an order of execution of the jobs and link information showing a link relationship between the jobs; a job management unit managing the order of execution of the registered jobs; a priority change unit performing a priority change in response to a priority change request for the registered jobs; and an image formation unit executing the jobs according to the order of execution, wherein the priority change unit changes a priority or priorities of another job or the other jobs in a link relationship with a job on which a priority change has been performed to the same priority as the job on which a priority change has been performed.

13 Claims, 10 Drawing Sheets

| JOB LIST | | | PRIORITY CHANGE |
|---|---|---|---|
| JobNo | STATE | USER NAME | IMAGE DATA TITLE |
| 1 | Printing | User1 | Doc1 |
| 2 | Waiting | User2 | Doc2 |
| 3 | Waiting | User3 | Doc3 |
| 4 | Waiting | User4 | Doc4 |

IMAGE FORMATION APPARATUS AND IMAGE FORMATION SYSTEM

This application is based on Japanese Patent Application No. 2004-309515 filed in Japan on Oct. 25, 2004, the contents of which are hereby incorporated by reference.

BACKGROUND OF THE INVENTION

1. Field of the Invention

This invention relates to an image formation apparatus connected to a network.

2. Description of the Background Art

In recent years, image formation apparatuses, such as a printer, a facsimile, a copying machine and a composite machine, have been connected to plural terminals on a network and image formation jobs are transmitted to respective image formation apparatuses from the terminals. Usually, in an image formation apparatus, image formation jobs are executed according to an order of reception of the jobs. Of image formation jobs, there are jobs that are wanted to be executed taking precedence over the other jobs, while there are jobs to be executed in no particular hurry. Therefore, a case arises where, priorities are assigned to respective jobs, such that the priorities are reflected on an order of execution of image formation job.

Various kinds of image formation apparatuses have been proposed, examples of which include an image formation apparatus in which priorities of jobs are determined based on elapsed times from time points when respective image data are inputted (for example, see Japanese Patent Laid-open Publication No. 2002-137500), an image formation apparatus in which a job with a shorter processing time for printing predicted from a past record or the like has a priority in print processing (for example, see Japanese Patent Laid-open Publication No. H06-168085) and an image formation apparatus in which image formation of an image data with a higher priority assigned in advance according to a level of emergency is processed at an earlier time point (for example, see Japanese Patent Laid-open Publication No. H08-163332).

As for conventional image formation apparatuses, for example the image formation apparatuses described in the above patent literatures, in an apparatus, a priority of a job is assigned based on a input time point of image data and; in another apparatus, a job with a shorter processing time is subjected to print processing with a higher priority, each of which is useful for improvement on a print efficiency. Moreover, in a still another conventional image formation apparatus, priorities corresponding to levels of emergency are given to respective image data and a job with a higher priority is executed at an earlier time point. In such image formation apparatuses, priorities are assigned to jobs in an order of execution thereof and a priority change on jobs can be individually performed. In printers connected to a network as done in recent years, however, even in a case where, of many jobs, a series of plural jobs concerning image data related to one another are desired to be collectively outputted, a priority change has to be done in execution of each of the series of plural jobs, having led to great inconvenience.

Image data received in a conventional image formation apparatus is rasterized and enters a state of print-waiting. Therefore, a priority change is limited to a job or jobs in a state of print-waiting and there is a restraint that the priority change is performed only at a specific timing.

SUMMARY OF THE INVENTION

It is an object of the invention to provide image formation apparatus and method capable of collectively performing a priority change on a series of plural jobs concerning image data related to each other or one another. It is another object of the invention to provide image formation apparatus and method capable of performing a priority change even in rasterization after reception of image data.

An image formation apparatus of the invention includes:

a job input unit receiving job inputs of performing image formation from image data;

a job registration unit registering the jobs of performing image formation from the image data together with priorities in an order of execution of the jobs and link information showing a link relationship between the jobs;

a job management unit managing the order of execution of the registered jobs;

a priority change unit performing a priority change in response to a priority change request for the registered jobs; and an image formation unit executing the jobs according to the order of execution, wherein the priority change unit changes a priority or priorities of another job or the other jobs in a link relationship with a job on which a priority change has been performed to the same priority as the job on which a priority change has been performed.

The priority change unit can preferably determine that a job having at least one designated piece of link information is a job having a link relationship with the job on which the priority change has been performed.

The link information may be any selected from the group consisting of user information identifying a user of the jobs, image data information identifying image data of the jobs and job link information showing a link between plural jobs. The job link information may be bind information concerning a bind output collectively performing image formation from plural image data.

The image formation apparatus of the invention further includes a rasterization processing unit rasterizing image data of the inputted jobs, wherein the job registration unit may register a job of image data in rasterization, and the priority change unit may perform a priority change of the job of image data in rasterization.

The job management unit may reorganize the order of execution of the registered jobs, after a priority change has been performed on a job and jobs in a link relationship with the job, based on priorities after the priority change.

The job management unit may reorganize the order of execution of jobs of performing image formation from image data except the image data in rasterization.

The jobs of performing image formation from image data may be jobs of performing image formation from a synthetic image obtained by synthesizing manuscript image data and synthetic image data, the job link information may be synthetic information from the manuscript image data and the synthetic image data, the job management unit may include a first job management unit managing an order of execution of jobs of the manuscript image data and a second management unit managing an order of execution of jobs of the synthetic image data, the priority change unit may perform a priority change in response to a change request for priorities of jobs of the manuscript image data or the synthetic image data, and also change priorities of jobs of the synthetic image data having synthetic information of, or the manuscript image data having, the same job link information as the job on which a priority change has been performed to the same priority as the job on which a priority change has been performed.

The image formation apparatus may be connected to a network and the job input unit may receive job inputs of performing image formation from image data from a terminal connected to the network.

An image formation method of the invention includes the steps of:

receiving job inputs of performing image formation from image data;

registering the jobs of performing image formation from the image data together with priorities in an order of execution of the jobs and link information showing a link relationship between the jobs;

managing the order of execution of the registered jobs;

performing a priority change in response to a priority change request for the registered jobs, and also changing a priority or priorities of another job or the other jobs in a link relationship with a job on which a priority change has been performed to the same priority as the job on which a priority change has been performed; and executing the registered jobs according to the order of execution.

The image formation method may further include a step of reorganizing the order of execution of the registered jobs, after a priority change is performed on a job and jobs in a link relationship with the job, based on priorities after the priority change.

An image formation program of the invention is a image formation program for executing the above steps on a computer. A storage medium is readable by a computer in which the image formation program is stored.

An image formation apparatus of the invention can collectively perform a priority change on a series of plural jobs concerning image data related to each other or one another. A priority change can be performed regardless of timing.

BRIEF DESCRIPTION OF THE DRAWING

The present invention will become readily understood from the following description of preferred embodiments thereof made with reference to the accompanying drawings, in which like parts are designated by like reference numeral and in which.

DESCRIPTION OF THE PREFERRED EMBODIMENTS

Description will be given of an image formation apparatus and an image formation method concerning embodiments of the invention below using the accompanying drawing. In the figures, the same symbols are attached to substantially the same constituent members.

First Embodiment

Figure 1:
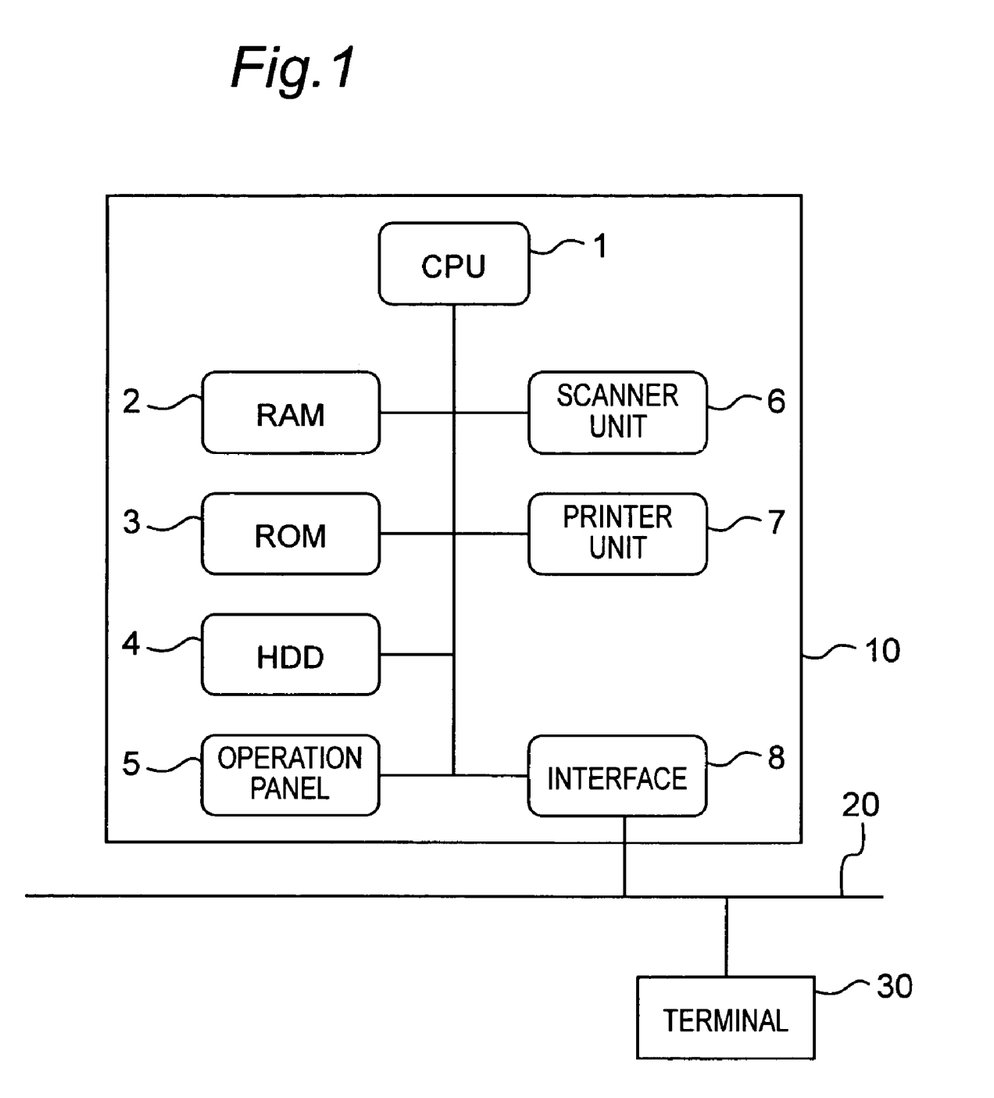
FIG. 1 is a block diagram showing a construction of an image formation apparatus concerning a first embodiment of the invention.

FIG. 1 is a block diagram showing a construction of an image formation apparatus 10 concerning a first embodiment of the invention. The image formation apparatus 10 includes: CPU1; RAM2; ROM2; HDD4; an operation panel 5; a scanner unit 6; a printer unit 7; and an interface 8. CPU 1 controls the entire image forming apparatus and executes programs stored in ROM in CPU1 and RAM2. RAM2 temporarily stores data that CPU1 requires for executing a program and image data. ROM3 is a read-only memory, and programs, data and others read out when the apparatus starts or in other cases are stored in ROM3 in advance. HDD4 stores image data. The operation panel 5 is used for direct inputting by a user without interposing a network therebetween. A user inputs commands for display of an execution job list or for a priority change on jobs using the operation panel 5. The scanner unit 6 performs processing for reading image data from a manuscript. The printer unit 7 performs processing for printing image data based on an image formation job. The interface 8 is connected to the network 20 such as Ethernet and receives jobs of performing image formation from image data from the terminals 30 such as plural personal computers through the network 20.

Figure 2:
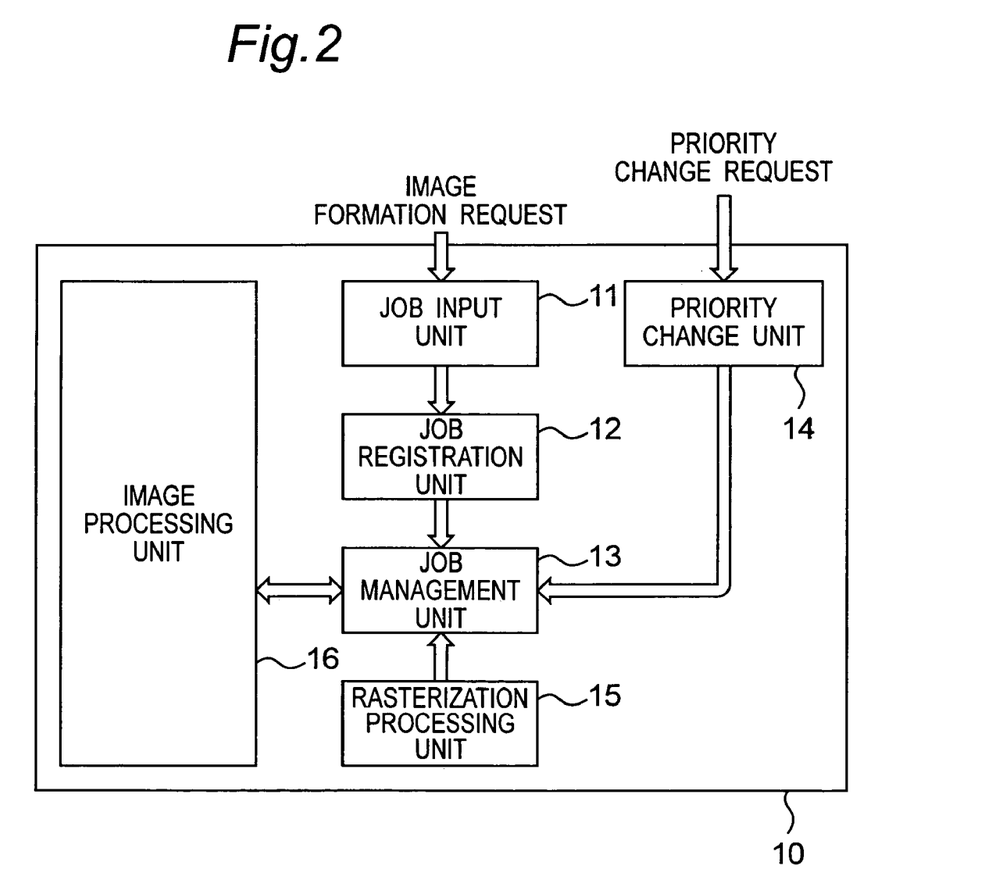
FIG. 2 is a block diagram showing a functional construction of the image formation apparatus concerning a first embodiment of the invention.

FIG. 2 is a block diagram showing functional constituent members of the image formation apparatus 10. The image formation apparatus 10 includes: a job input unit 11; a job registration unit 12; a job management unit 13; a priority change unit 14; a rasterization processing unit 15; and an image processing unit 16. The job input unit 11 receives a job input of performing image formation from image data. The job registration unit 12 registers jobs together with set priorities and link information showing a link relationship of the jobs. The job management unit 13 performs management of the registered jobs and prepares an execution job list table based on priorities assigned to respective jobs. The priority change unit 14 receives a priority change request for a job and not only changes a priority of the job, but also changes priorities of jobs in a link relationship with the job on which a priority change has been performed to the same priority as the job on which a priority change has been performed. Note that link information showing a link relationship with the jobs on which a priority change has been performed may be designated when a priority change on the job is performed. The rasterization unit 15 performs rasterization processing for image data of a received job. The image processing unit 16 executes jobs according to an order of execution of the execution job list. Note that while the constituent members can generally work by executing a program read on CPU 1, workings of the constituent members can be realized with hardware without limiting to such software for the realization thereof.

Figure 12:
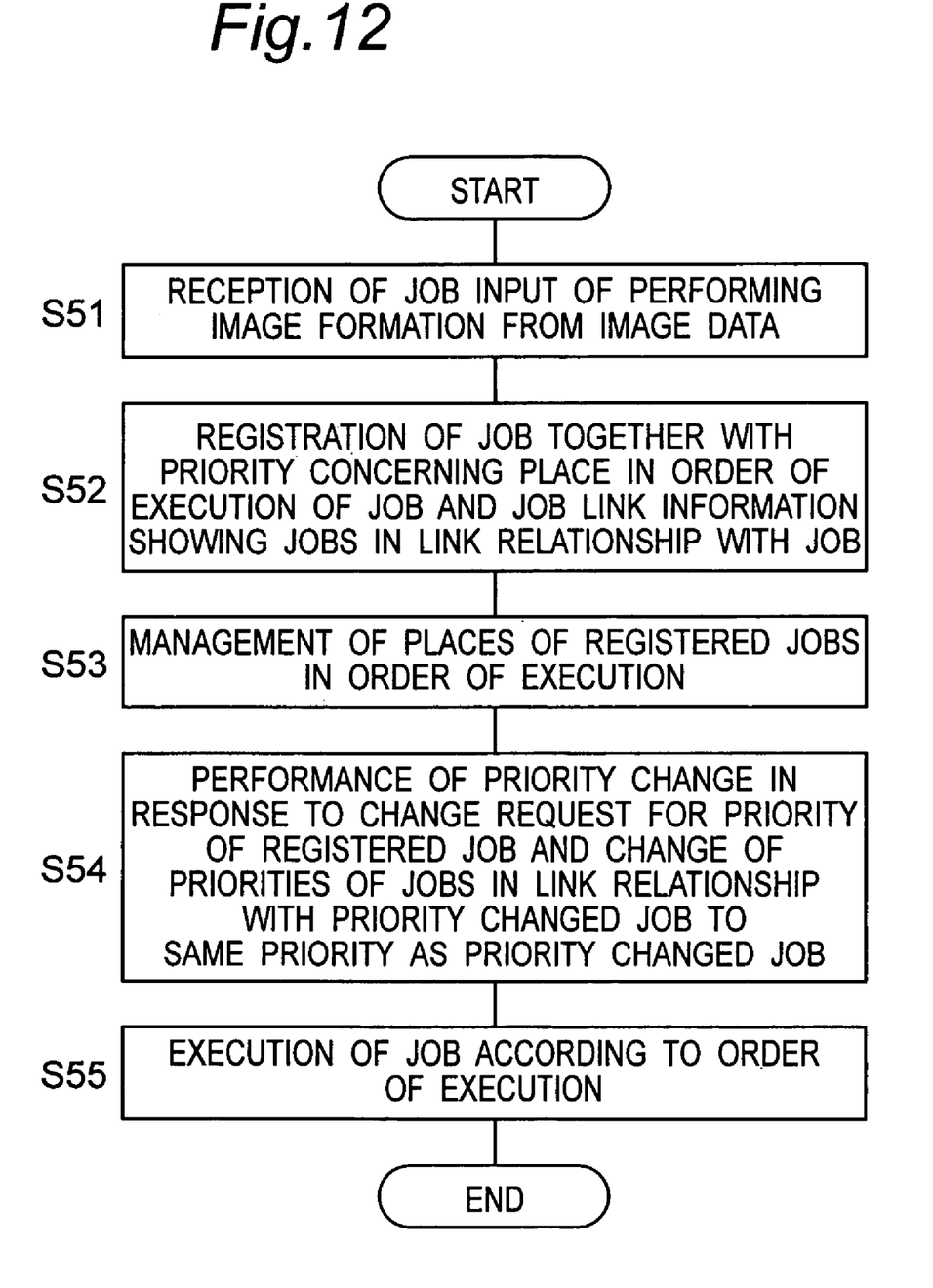
FIG. 12 is a flowchart showing an image formation method concerning the first embodiment of the invention.

An image formation method in the image formation apparatus is conducted, as done in a flowchart shown in FIG. 12 with the following steps of:

(a) receiving a job input of performing image formation from image data in the job input unit 11 (S51):

(b) registering the jobs of performing image formation from image data together with priorities of the jobs concerning an order of execution and link information showing a link relationship of the job in the job registration unit 12 (S52);

(c) managing places of the registered jobs in the order of execution in the job management unit 13 (S53);

(d) not only performing a priority change in response to a change request for a priority of the registered job in the priority change unit 14, but also changing priorities of jobs in a link relationship with the priority changed job to the same priority as the priority changed job (S54); and (e) executing jobs according to the order of execution in the image processing unit 16 (S55).

Table 1 is an example of an execution job list table registered in the order of reception of jobs.

TABLE 1

| Order of Execution | Job No. | Priority | User Name | Image Data Title | Job Link Information |
|---|---|---|---|---|---|
| 1 | 1 | Low | User 1 | Document 1 | Collabo 1 |
| 2 | 2 | Low | User 1 | Document 2 | Collabo 1 |
| 3 | 3 | Low | User 2 | Sheet 1 | Index 2 |
| 4 | 4 | Low | User 1 | Document 3 | Collabo 2 |
| 5 | 5 | Low | User 2 | Sheet 1 | Index 1 |
| 6 | 6 | Low | User 2 | Text 1 | Index 1 |

Figure 3:
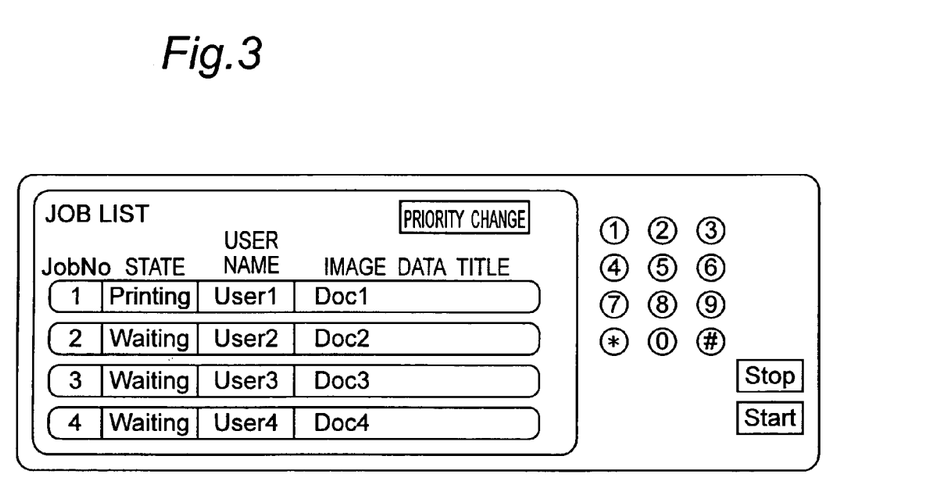
FIG. 3 is a simplified view of an operation panel in a case where a job list is displayed on the operation panel.

In Table 1, the term, "Job No." is an administrative number assigned to each job of performing received image formation when the job is registered in the job registration unit 12. The administrative number is a number specific to a job, which does not change even in a case where an order of execution is reorganized. The terms, "User Name," "Image Data Title" and "Job Link Information" are link information given to a job. Note that in Table 1, "low" is given to the priorities of all the jobs and a priority has two levels expressed with "high" and "low," as described later but expressed levels of a priority are not limited to the two levels: the levels of a priority may be expressed with letters, numerical values or the like. In the image processing unit, jobs are executed according to the order of execution of the execution job list table shown in Table 1. The execution job list table can be displayed on, for example, the operation panel 5 of the image formation apparatus as shown in FIG. 3. Note that the execution job list table may be displayed on the terminal 30 connected to the network 20.

An order of registration of jobs in the execution job list table is performed here in an order of job reception, while the order of registration is not limited thereto and the execution job list table may also be prepared by determining an order of registration based on a priority thereof upon reception. Alternatively, it is allowed that a new job is received and temporarily registered at the last place of the execution list table and thereafter the execution list table is reorganized based on priorities of the jobs.

Figure 4:
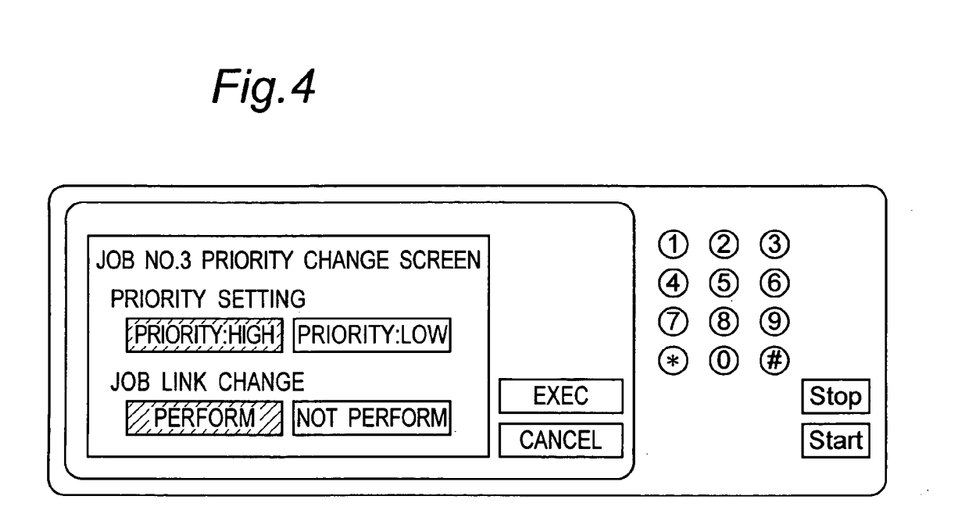
FIG. 4 is a simplified view of the operation panel in a case where a priority change screen image on which a priority change of a job is performed is displayed on the operation panel.

Then, description will be given of a case where a priority change is performed on a job specified by a user using FIGS. 4 to 6. FIG. 4 is a simplified view of the operation panel 5 in a case where a priority change screen image on which a priority change on a job expressed with Job No. 3 is performed is displayed on the operation panel 5. When a user, as shown in FIG. 3, selects a job on which the user wants to perform a priority change in an execution job list table displayed on the operation panel 5, for example the job expressed with Job No. 3, a priority change screen image is displayed as shown in FIG. 4. In FIG. 4, in setting a priority, one of "priority: low" and "priority: high" is selected. Besides, it is determined whether or not priority change (job link change) on a series of jobs in a link relationship with the selected job on which a priority change is performed are collectively performed accompanying the priority change of the selected job and priorities of the series of jobs are assigned according to selection of "performed" or "not performed." Note that while priority setting and a job link change are presented in one screen image, both may also be presented in plural screen images without limiting to the use of a single screen image.

Figure 5:
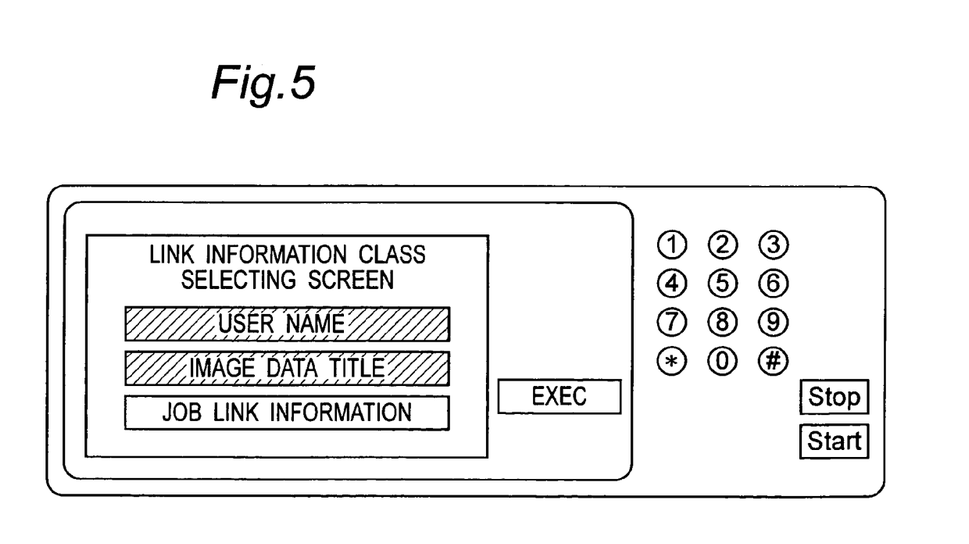
FIG. 5 is a simplified view of an operation panel in a case where a link information selecting screen image performing a link change accompanying a priority change of a job is displayed on the operation panel.

FIG. 5 is a simplified view of the operation panel 5 in a case where displayed on the operation panel 5 is a link information selecting screen image for designating a series of jobs in a link relationship with the selected job on which series of jobs a priority change is collectively performed, accompanying a priority change of the job expressed with Job No. 3. In FIG. 4, if it is selected that a job link change is "perform," "link information" selecting screen designating jobs in the link relationship on which a priority change is collectively performed is, as shown in FIG. 5, is displayed. Note that the "link information" includes "user information" identifying a user of a job; "image data information" identifying image data of the job; and "job link information" showing a link of plural jobs. The "user information" includes "user name." The "image data information" includes "image data title." The "job link information" includes "job link information written in PDL," and "bind job information." In FIG. 5, there is shown a case where "user name" and "image data title" are designated as "link information."

Figure 6:
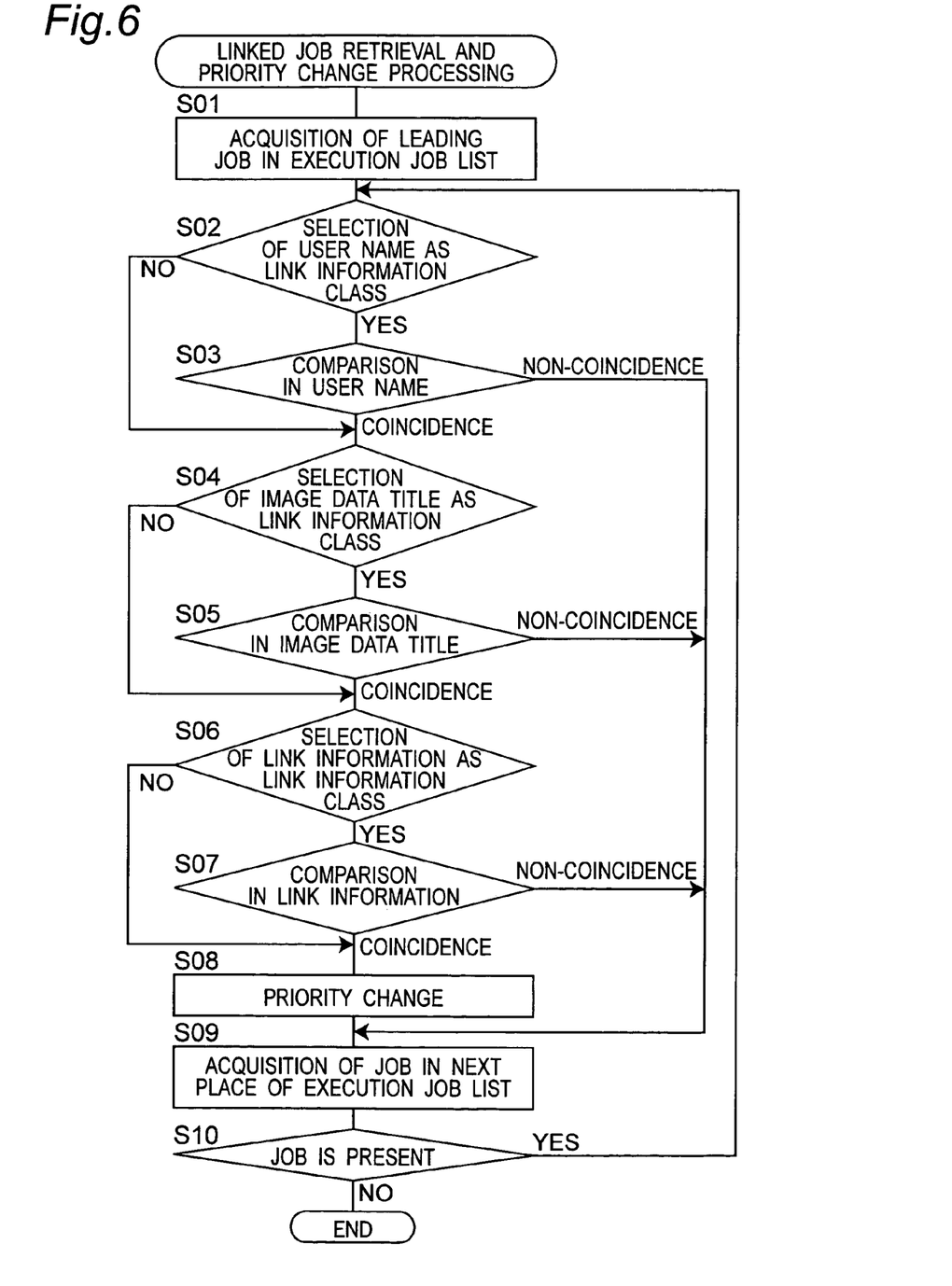
FIG. 6 is a flowchart showing retrieval of jobs in a link relationship with a job on which a priority change is performed and the priority change on the jobs in the link relationship.

FIG. 6 is a flowchart showing retrieval of jobs in a link relationship with a job on which a priority change is performed and the priority change collectively performed on the jobs in the link relationship. In the flowchart, retrieval is performed on jobs having the same combination in link information as a combination of selected link information (S01 to S07) and priorities of the jobs whose link information coincides with all the selected link information are changed to the same priority as the job on which a priority change has been performed (S08). To be detailed, the flow chart includes the following steps of:

(a) acquiring a leading job in the execution job list table (S01), (b) determining whether or not "user name" as a class of link information has been selected (S02) and going to step S04 if a user name is not selected, (c) comparing a user name of the leading job with the job on which a priority change has been performed in a case where the "user name" has been selected as link information to determine whether or not both coincide with each other (S03) and going to step S09 if the user names do not coincide with each other, (d) going to the next step S04 if the user names coincide with each other, (e) determining whether or not an "image data title" has been selected as a class of link information (S04) and going to step S06 if the image data title has not been selected, (f) comparing the image data title of the leading job with the image data title of a job on which a priority change has been performed in a case where the "image data title" has been selected as link information to determine whether or not both coincide with each other (S05) and going to step S09 if the image data titles do not coincide with each other, (g) going to the next step S06 if the image data titles coincide with each other, (h) determining whether or not "job link information" has been selected as a class of link information (S06) and going to step S08 where a priority change is performed since, if the job link information has not been selected, link information that has been selected at the time point coincides with each other, (i) comparing job link information of a job with job link information of the job on which a priority change has been performed if the "job link information" has been selected as link information to determine whether or not both coincide with each other (S07) and going to the next step S09 if both the job link information do not coincide with each other, (j) going to the next step S08 if both the job link information coincide with each other, (k) changing priorities of jobs all of whose link information coincides with the selected link information, that is priorities of jobs in a link relationship with the job on which a priority change has been performed to the same priority of the job on which a priority change has been performed (S08), (l) acquiring a job in the next place in the order of execution in the execution job list (S09), (m) determining whether or not the next job is present (S10) and going back to step S02 if the next job is present (Y), while ending the process if not present (N).

By performing all the steps described above, a priority change on jobs in a link relationship with a job on which a priority change has been performed can be collectively performed.

Note that the priority change on the jobs in the link relationship is performed only on jobs each coinciding in one of "user name," "image data title" and "job link information" as "link information" or on jobs each satisfying an AND condition of, if the plural link information are selected, coinciding in all selected link information. Retrieval of jobs in the link relationship is not limited to use of such an AND condition and the retrieval may also be performed using an OR condition of coinciding in one of classes of selected plural link information.

Figure 7:
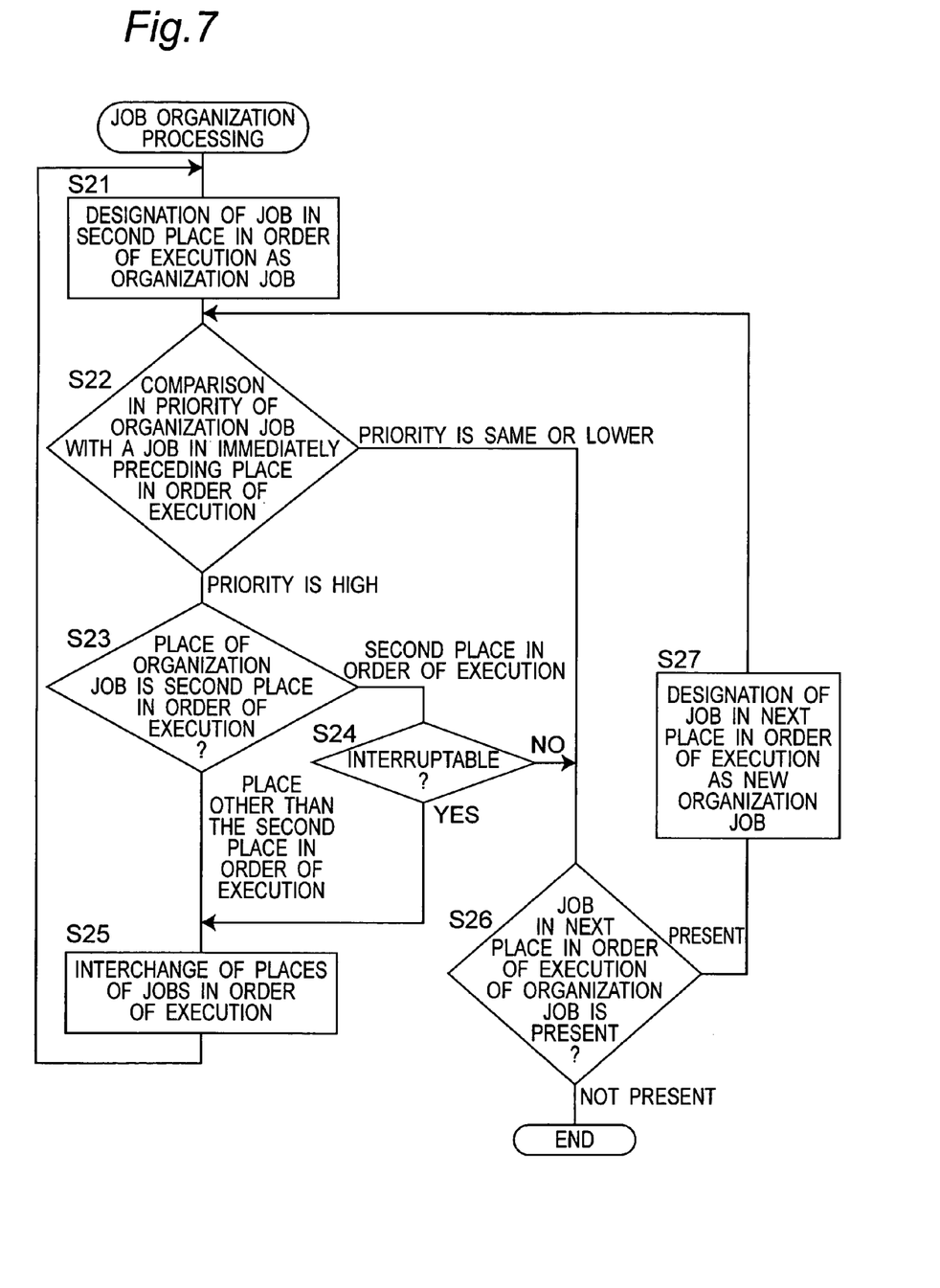
FIG. 7 is a flowchart showing reorganization of an execution job list table in a case where a priority of a job has been changed.

Then, description will be given of a case where an execution job list table is reorganized based on priorities assigned in a collective priority change performed on a series of jobs in a link relationship with a job on which a priority change has been performed using a flowchart of FIG. 7. In the flowchart, it is determined whether or not there occurs a change in order of execution of jobs from a job in the second place in the order of execution toward a place later than the second place to thereby reorganize the execution job list table. The flowchart includes the following steps of:

(a) first of all, designating a job in the second place in an order of execution as an organization job in the execution job list table (S21), (b) comparing a priority of a job in the immediately preceding place of the organization job with a priority of the organization job (S22), and going to step S26 if both are of the same priority or the priority of the organization job is lower, (c) on the other hand, determining whether the organization job is in the second place or a place other than the second place in the order of execution if a priority of the organization job is higher (S23), and going to step S24 if the organization job is in the second place in the order of execution, while going to step S25 if the organization job is in a place other than the second place in the order of execution, (d) determining whether or not the organization job is interchangeable with the job in the first place in the order of execution, that is, whether or not the organization job is interruptable, if the organization job is in the second place in the order of execution (S24), wherein no interrupt can be done in printing of the job in the first place in the order of execution, and going to step S26 if no interrupt can be done (N), while going to step S25 if interrupt can be done (Y).

(e) interchanging the organization job with a job in the immediately preceding place in the order of execution (S25) and thereafter, going to step S21, (f) determining whether or not a job is present in the next place of the organization job in the order of execution if no interchange has been done in the order of execution (S26) and going to step S27 if a job is present in the next place in the order of execution, while ending the job organization processing if no job is present in the next place in the order of execution, and (g) designating a job in the next place in the order of execution of the organization job as a new organization job (S27) and thereafter, going back to step S22.

By performing all the steps described above, reorganization of an execution job list table can be performed.

EXAMPLE 1

Example 1 is a case where a priority change was performed on a job expressed with Job No. 5, wherein "user name" was selected as link information showing a link relationship with the job on which a priority change had been performed. Description will be given of a case where a priority change was collectively performed on jobs in a link relationship with the job expressed with Job No. 5 using Tables 2 and 3. Table 2 is an execution job list table after a priority change was performed on jobs coinciding with the job expressed with Job No. 5 in selected link information in a case where "user name" was selected as link information.

TABLE 2

| Order of Execution | Job No. | Priority | User Name | Image Data Title | Job Link Information |
|---|---|---|---|---|---|
| 1 | 1 | Low | User 1 | Document 1 | Collabo 1 |
| 2 | 2 | Low | User 1 | Document 2 | Collabo 1 |
| 3 | 3 | Low to high | User 2 | Sheet 1 | Index 2 |
| 4 | 4 | Low | User 1 | Document 3 | Collabo 2 |
| 5 | 5 | High | User 2 | Sheet 1 | Index 1 |
| 6 | 6 | Low to High | User 2 | Text 1 | Index 1 |

In Table 2, since "user name" of a job expressed with Job No. 5 is User 2, a priority change is performed on two jobs expressed with Job No. 3 and Job No. 6, respectively coinciding with the job expressed with Job No. 5 in user name to change priorities thereof from low to high.

Then, in Table 3, there is shown an execution job list table on which reorganization on an order of execution is performed based on changed priorities.

TABLE 3

| Order of Execution | Job No. | Priority | User Name | Image Data Title | Job Link Information |
|---|---|---|---|---|---|
| 1 | 3 | High | User 2 | Sheet 1 | Index 2 |
| 2 | 5 | High | User 2 | Sheet 1 | Index 1 |
| 3 | 6 | High | User 2 | Text 1 | Index 1 |
| 4 | 1 | Low | User 1 | Document 1 | Collabo 1 |
| 5 | 2 | Low | User 1 | Document 2 | Collabo 1 |
| 6 | 4 | Low | User 1 | Document 3 | Collabo 2 |

In Table 3, places in the order of execution of three jobs expressed with Job No. 3, Job No. 5 and Job No. 6 priorities of which were changed from low to high are changed to be reorganized in the first place to the third place, respectively, in the order of execution.

EXAMPLE 2

Example 2 is a case where a priority change was performed on a job expressed with Job No. 5, wherein "user name" and "image data title" were selected as link information showing a link relationship with the job on which a priority change had been performed. Description will be given of a case where a priority change was collectively performed on jobs in a link relationship with the job expressed with Job No. 5 using Tables 4 and 5. Table 4 is an execution job list table after a priority change was performed on jobs coinciding with the job expressed with Job No. 5 in selected link information in a case where "user name" and "image data title" were selected as link information.

TABLE 4

| Order of Execution | Job No. | Priority | User Name | Image Data Title | Job Link Information |
|---|---|---|---|---|---|
| 1 | 1 | Low | User 1 | Document 1 | Collabo 1 |
| 2 | 2 | Low | User 1 | Document 2 | Collabo 1 |
| 3 | 3 | Low to High | User 2 | Sheet 1 | Index 2 |
| 4 | 4 | Low | User 1 | Document 3 | Collabo 2 |
| 5 | 5 | High | User 2 | Sheet 1 | Index 1 |
| 6 | 6 | Low | User 2 | Text 1 | Index 1 |

As shown in Table 4, a priority change is performed from "low" to "high" on a job (No. 3) coinciding with the job (No. 5) in both "user information" and "image data information" of selected link information.

Then, in Table 5, there is shown an execution job list table on which reorganization was performed in the order of execution based on changed priorities.

TABLE 5

| Order of Execution | Job No. | Priority | User Name | Image Data Title | Job Link Information |
|---|---|---|---|---|---|
| 1 | 3 | High | User 2 | Sheet 1 | Index 2 |
| 2 | 5 | High | User 2 | Sheet 1 | Index 1 |
| 3 | 1 | Low | User 1 | Document 1 | Collabo 1 |
| 4 | 2 | Low | User 1 | Document 2 | Collabo 1 |
| 5 | 4 | Low | User 1 | Document 3 | Collabo 2 |
| 6 | 6 | Low | User 2 | Text 1 | Index 1 |

In Table 5, places of two jobs expressed with Job No. 3 and Job No. 5 whose priorities were changed from low to high are changed in the order of execution.

EXAMPLE 3

Example 3 is a case where a priority change was performed on a job expressed with Job No. 5, wherein "user name" and "job link information" were selected as link information showing a link relationship with the job on which a priority change had been performed. Description will be given of a case where a priority change was collectively performed on jobs in a link relationship with the job expressed with Job No. 5 using Tables 6 and 7. Table 6 is an execution job list table after a priority change was performed on jobs coinciding with the job expressed with Job No. 5 in selected link information in a case where "user name" and "job link information" were selected as link information.

TABLE 6

| Order of Execution | Job No. | Priority | User Name | Image Data Title | Job Link Information |
|---|---|---|---|---|---|
| 1 | 1 | Low | User 1 | Document 1 | Collabo 1 |
| 2 | 2 | Low | User 1 | Document 2 | Collabo 1 |
| 3 | 3 | Low | User 2 | Sheet 1 | Index 2 |
| 4 | 4 | Low | User 1 | Document 3 | Collabo 2 |
| 5 | 5 | High | User 2 | Sheet 1 | Index 1 |
| 6 | 6 | Low to high | User 2 | Text 1 | Index 1 |

As shown in Table 6, a priority change is performed from "low" to "high" on a job (No. 6) coinciding with the job (No. 5) in both "user name" and "job link information" of selected link information.

Then, in Table 7, there is shown an execution job list table on which reorganization was performed in the order of execution based on changed priorities.

TABLE 7

| Order of Execution | Job No. | Priority | User Name | Image Data Title | Job Link Information |
|---|---|---|---|---|---|
| 1 | 5 | High | User 2 | Sheet 1 | Index 1 |
| 2 | 6 | High | User 2 | Text 1 | Index 1 |
| 3 | 1 | Low | User 1 | Document 1 | Collabo 1 |
| 4 | 2 | Low | User 1 | Document 2 | Collabo 1 |
| 5 | 3 | Low | User 2 | Sheet 1 | Index 2 |
| 6 | 4 | Low | User 1 | Document 3 | Collabo 2 |

In Table 7, places of two jobs expressed with Job No. 5 and Job No. 6 whose priorities were changed from low to high are changed in the order of execution.

EXAMPLE 4

Figure 8:
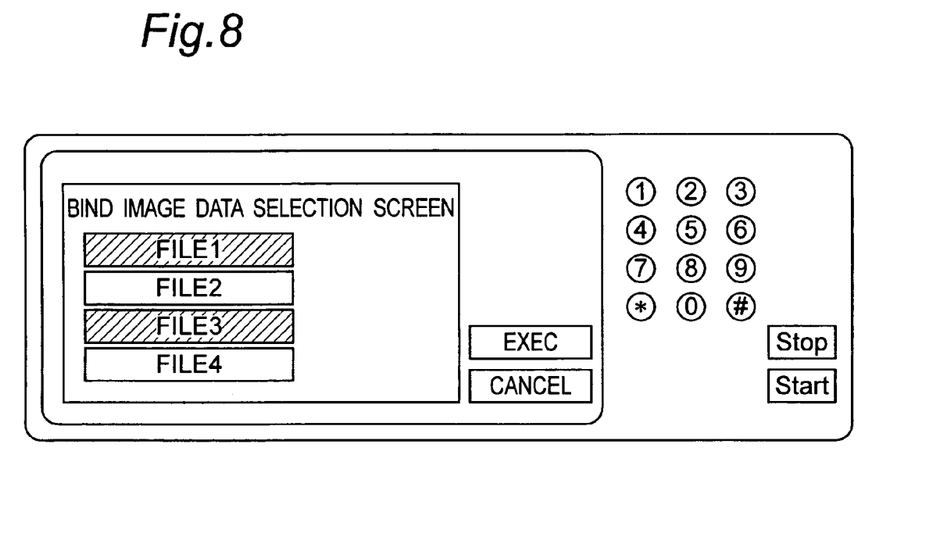
FIG. 8 is a simplified view of the operation panel in a case where a selection screen image of image data to be bound-outputted is displayed on the operation panel.

Example 4 concerns a case of bind output processing collectively outputting plural image data. FIG. 8 is a simplified view of the operation panel 5 in a case where a screen image selecting image data collectively outputted (bind-outputted) is displayed on the operation panel 5 in bind output processing. In the figure, two image data including "FILE 1" and "FILE 3" as image data titles are selected for bind output processing thereon. In Example 4, "job link information" includes "bind job information" showing jobs of bind image data outputted as "job link information." Note that bind job information is given upon selection of image data of which bind-output is performed.

In a case where a priority change is performed on jobs of image data bind-outputted by a user, the priority change may be performed by selecting jobs on which a priority change is performed in an execution job list table in a similar way to that in the above case. Thereafter, in a case where "job link information" is selected as "link information" showing jobs in a link relationship, a priority change can be collectively performed on jobs (bind jobs) having the same bind job information since "job link information" is the bind job information.

Figure 9:
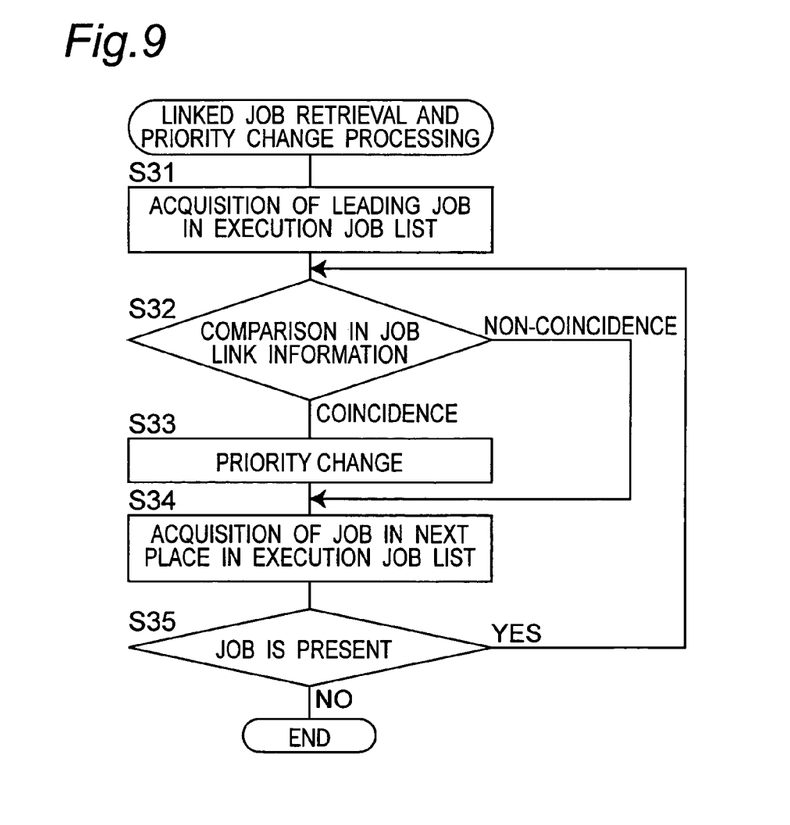
FIG. 9 is a flowchart showing retrieval of a linked job and a priority change on jobs in link relationship.

FIG. 9 is a flowchart showing a case where a priority change is collectively performed on jobs having the same bind job information as the job on which a priority change has been performed, wherein selected is bind job information, that is, "job link information," as link information showing a link relationship with the job on which a priority change has been performed. The flowchart includes the following steps of:

(a) first of all, acquiring a leading job in an execution job list table (S31), (b) then, comparing "job link information" of the job as link information with job link information of a job on which a priority change has been performed to determine whether or not both coincide with each other (S32) and going to step S34 if both do not coincide with each other, (c) changing priorities of the jobs to the same priority as the job on which a priority change has been performed if both job link information coincide with each other (S33), (d) acquiring a job in the next place in the order of execution in the execution job list table (S34), (e) determining whether or not the next job is present (S35) and going back to step S32 if the next job is present (Y), while ending the process if the next job is not present (N).

By performing all the steps described above, a priority change can be collectively performed on jobs, to be bind-outputted, in a link relationship with a job on which a priority change has been performed.

EXAMPLE 5

In Example 5, a priority change is performed on Job No. 5 in a similar way as those in Examples 1 to 3. Selected as link information are "user name" and "job link information."

Besides, in Example 5, a job in rasterization is registered in the execution job list table and a priority change is allowed on the job. In reorganization of the execution job list table, however, a change of a place in the order of execution is performed only on jobs other than a job in rasterization. Thereby, a priority change can be performed on a job regardless of whether or not the job is in rasterization; therefore, a priority change can be performed irrespective of timing. On the other hand, since a job cannot be executed immediately even after a job in rasterization takes high in priority, a change of a place in the order of execution is implemented after the rasterization, thereby enabling a non-executable job to be avoided from being registered as a job earlier in the order of execution.

Note that in the execution job list table, there are shown states including "in rasterization," "print-waiting," "in printing" and the like as status information as shown in Table 8. Rasterization processing for image data is performed in the rasterization processing unit 15 shown in FIG. 2 and when the rasterization processing ends, status information is changed from "in rasterization" to "print-waiting."

TABLE 8

| Order of Execution | Job No. | Status Information | Priority | User Name | Image Data Title | Job Link Information |
|---|---|---|---|---|---|---|
| 1 | 1 | In printing | Low | User 1 | Document 1 | Collabo 1 |
| 2 | 2 | Print-waiting | Low | User 1 | Document 2 | Collabo 1 |
| 3 | 3 | Print-waiting | Low | User 2 | Sheet 1 | Index 2 |
| 4 | 4 | Print-waiting | Low | User 1 | Document 3 | Collabo 2 |
| 5 | 5 | In rasterization | Low | User 2 | Sheet 1 | Index 1 |
| 6 | 6 | In rasterization | Low | User 2 | Text 1 | Index 1 |

Table 9 is an execution job list table after priorities are changed on jobs (Job No. 5 and Job No. 6) in rasterization.

TABLE 9

| Order of Execution | Job No. | Status Information | Priority | User Name | Image Data Title | Job Link Information |
|---|---|---|---|---|---|---|
| 1 | 1 | In printing | Low | User 1 | Document 1 | Collabo 1 |
| 2 | 2 | Print-waiting | Low | User 1 | Document 2 | Collabo 1 |
| 3 | 3 | Print-waiting | Low | User 2 | Sheet 1 | Index 2 |
| 4 | 4 | Print-waiting | Low | User 1 | Document 3 | Collabo 2 |
| 5 | 5 | In rasterization | High | User 2 | Sheet 1 | Index 1 |
| 6 | 6 | In rasterization | High | User 2 | Text 1 | Index 1 |

Since a job in rasterization, as shown in Table 9, is not an object of a change in the order of execution even if a priority change is performed, no change occurs in the order of execution even if reorganization is performed in the execution job list table.

Table 10 is an execution job list table after rasterization processing for the job expressed with Job No. 5 ends and the process enters a state of "print-waiting."

TABLE 10

| Order of Execution | Job No. | Status Information | Priority | User Name | Image Data Title | Job Link Information |
|---|---|---|---|---|---|---|
| 1 | 1 | In printing | Low | User 1 | Document 1 | Collabo 1 |
| 2 | 2 | Print-waiting | Low | User 1 | Document 2 | Collabo 1 |
| 3 | 3 | Print-waiting | Low | User 2 | Sheet 1 | Index 2 |
| 4 | 4 | Print-waiting | Low | User 1 | Document 3 | Collabo 2 |

TABLE 10-continued

| Order of Execution | Job No. | Status Information | Priority | User Name | Image Data Title | Job Link Information |
|---|---|---|---|---|---|---|
| 5 | 5 | Print-waiting | High | User 2 | Sheet 1 | Index 1 |
| 6 | 6 | In rasterization | High | User 2 | Text 1 | Index 1 |

After rasterization processing for the job expressed with Job No. 5 ends and status information changes to print-waiting, the execution job list table is reorganized. Table 11 is an execution job list table after the execution job list table shown in Table 10 is reorganized.

TABLE 11

| Order of Execution | Job No. | Status Information | Priority | User Name | Image Data Title | Job Link Information |
|---|---|---|---|---|---|---|
| 1 | 1 | In printing | Low | User 1 | Document 1 | Index 2 |
| 2 | 5 | Print-waiting | High | User 2 | Sheet 1 | Index 1 |
| 3 | 2 | Print-waiting | Low | User 1 | Document 2 | Collabo 1 |
| 4 | 3 | Print-waiting | Low | User 2 | Sheet 1 | Index 2 |
| 5 | 4 | Print-waiting | Low | User 1 | Document 3 | Collabo 2 |
| 6 | 6 | In rasterization | High | User 2 | Text 1 | Index 1 |

Table 12 is an execution job list table after rasterization processing for a job expressed with Job no. 6 ends and the process enters a state of "print-waiting."

TABLE 12

| Order of Execution | Job No. | Status Information | Priority | User Name | Image Data Title | Job Link Information |
|---|---|---|---|---|---|---|
| 1 | 1 | In printing | Low | User 1 | Document 1 | Index 2 |
| 2 | 5 | Print-waiting | High | User 2 | Sheet 1 | Index 1 |
| 3 | 2 | Print-waiting | Low | User 1 | Document 2 | Collabo 1 |
| 4 | 3 | Print-waiting | Low | User 2 | Sheet 1 | Index 2 |
| 5 | 4 | Print-waiting | Low | User 1 | Document 3 | Collabo 2 |
| 6 | 6 | Print-waiting | High | User 2 | Text 1 | Index 1 |

After raterization processing for the job expressed with Job No. 6 ends and status information is changed to a state of print-waiting, the execution job list table is reorganized. Table 13 is an execution job list table after the execution job list table shown in Table 12 is reorganized.

TABLE 13

| Order of Execution | Job No. | Status Information | Priority | User Name | Image Data Title | Job Link Information |
|---|---|---|---|---|---|---|
| 1 | 1 | In printing | Low | User 1 | Document 1 | Index 2 |
| 2 | 5 | Print-waiting | High | User 2 | Sheet 1 | Index 1 |
| 3 | 6 | Print-waiting | High | User 2 | Text 1 | Index 1 |
| 4 | 2 | Print-waiting | Low | User 1 | Document 2 | Collabo 1 |
| 5 | 3 | Print-waiting | Low | User 2 | Sheet 1 | Index 2 |
| 6 | 4 | Print-waiting | Low | User 1 | Document 3 | Collabo 2 |

Second Embodiment

Figure 10:
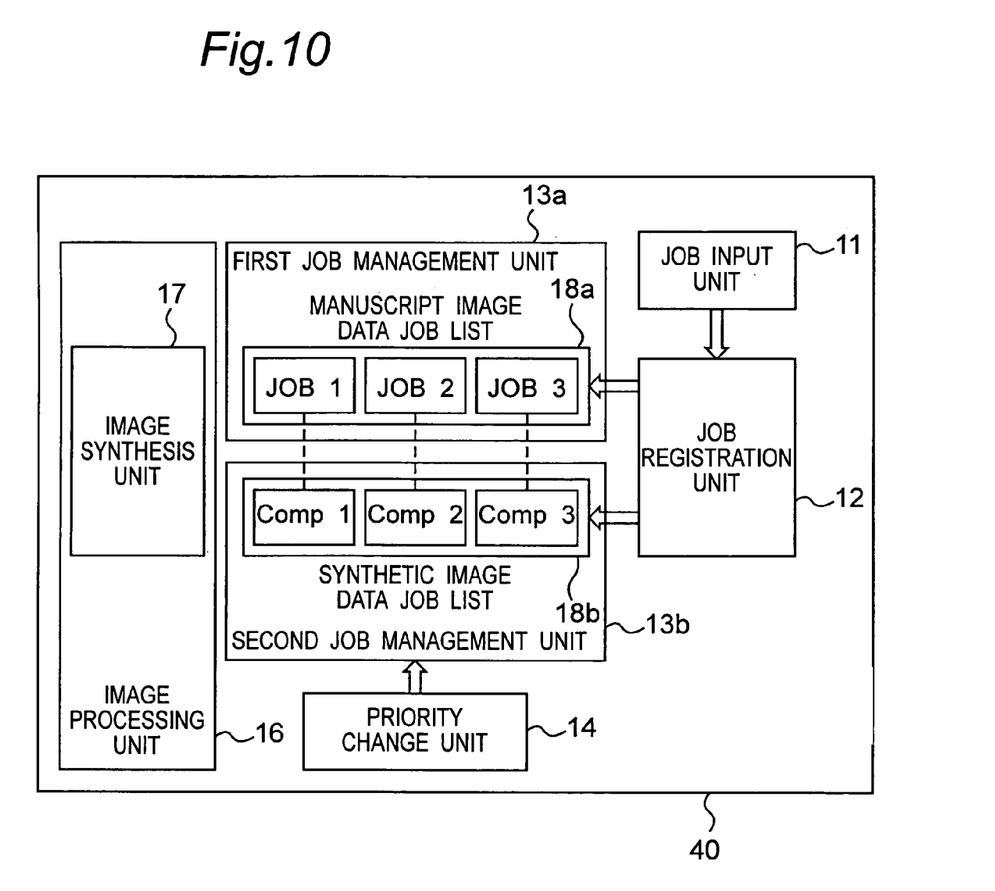
FIG. 10 is a block diagram showing a functional construction in which a synthetic image formation processing is performed in an image formation apparatus concerning a second embodiment of the invention.

FIG. 10 is a block diagram showing a functional construction in which a synthetic image formation processing for image formation of a synthetic image job obtained by synthesis of manuscript image data and synthetic image data is performed in an image formation apparatus concerning the second embodiment of the invention. The image formation apparatus 40 is different from the image formation apparatus concerning the first embodiment by comparison in that the image formation apparatus 40 includes: as job management units, a first job management unit 13a managing an execution job list table 18a of manuscript image data; and a second management unit 13b managing an execution job list table 18b of synthetic image data. The image processing unit 16 includes an image synthesis unit 17 synthesizing the manuscript image data and the synthetic image data. JOB 1 of manuscript image data, as shown in FIG. 10, corresponds to Comp 1 of synthetic image data. JOB 2 and Comp 2 correspond to JOB 3 and Comp 3, respectively.

Table 14 is an execution job list table 18a of manuscript image data.

TABLE 14

| Order of Execution | Job No. | Status Information | Priority | User Name | Image Data Title | Job Link Information |
|---|---|---|---|---|---|---|
| 1 | 1 | In printing | Low | User 1 | Document 1 | Comp No. 1 |
| 2 | 2 | Print-waiting | Low | User 1 | Document 2 | Comp No. 2 |
| 3 | 3 | Print-waiting | Low | User 2 | Document 3 | Comp No. 3 |

Table 15 is an execution job list table 18b of synthetic image data.

TABLE 15

| Order of Execution | Job No. | Status Information | Priority | User Name | Image Data Title | Job Link Information |
|---|---|---|---|---|---|---|
| 1 | 1 | In printing | Low | User 1 | Composite 1 | Job No. 1 |
| 2 | 2 | Print-waiting | Low | User 1 | Composite 2 | Job No. 2 |
| 3 | 3 | Print-waiting | Low | User 2 | Composite 3 | Job No. 3 |

In Tables 14 and 15, Job No. and Comp No. are administrative numbers that the job registration unit 12 attaches to jobs upon job registration. In job link information, there are shown Comp No. or Job No. corresponding to manuscript image data and synthetic image data, respectively, in a pair constituting a synthetic image.

A priority change on a job is performed with respect to each of manuscript image data and synthetic image data separately. On the other hand, in a case where a priority change is performed with respect to one of manuscript image data and synthetic image data, a priority of the other of synthetic image data and manuscript image data is simultaneously changed. For example, in a case where a priority of a job of manuscript image data (Job No. 2) is changed in Table 14, a priority of a job of synthetic image data (Comp No. 2) having Job No. 2 with the same job link information is changed to the same priority as the changed priority of a job (Job No. 2) of manuscript image data.

Figure 11:
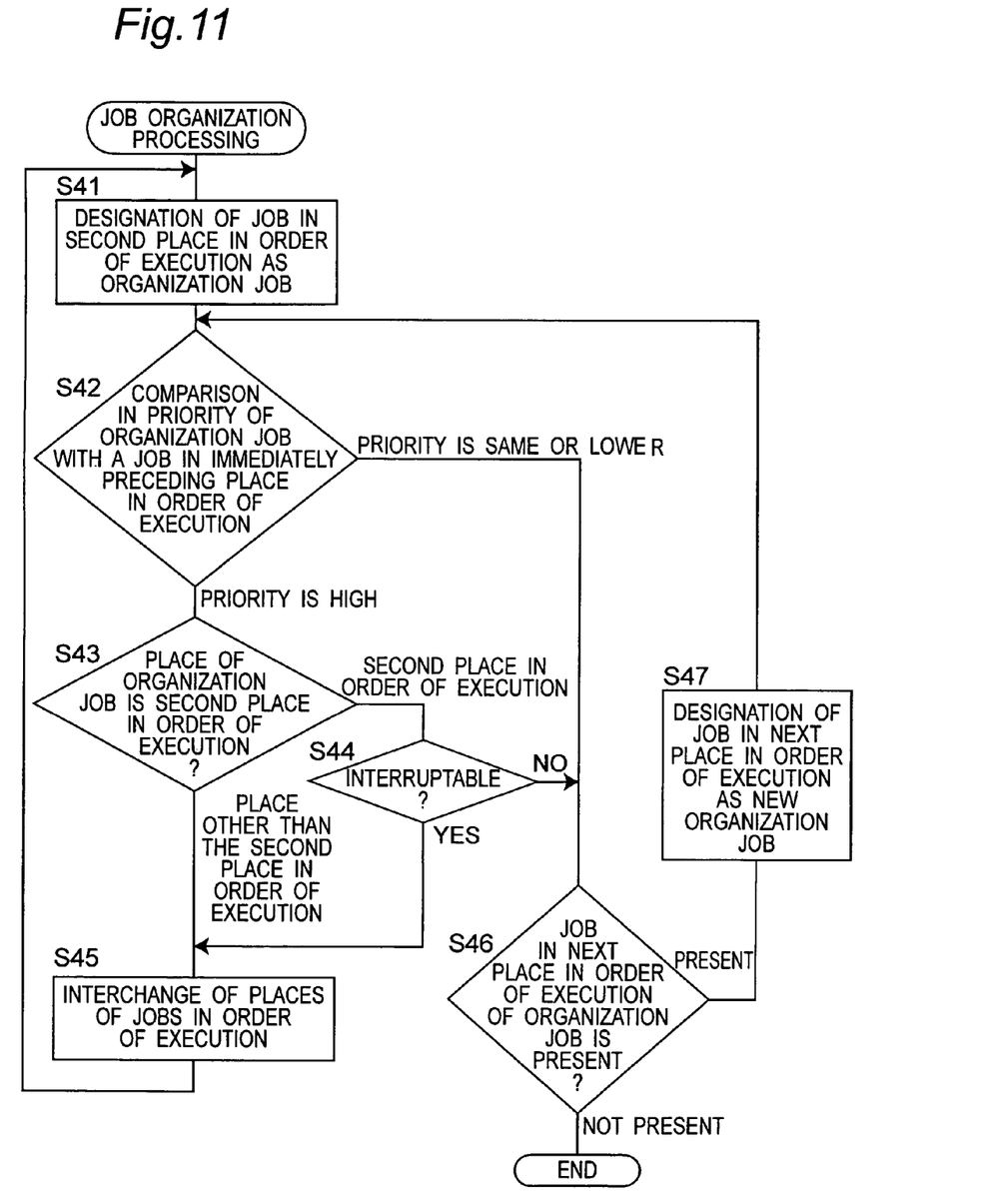
FIG. 11 is a flowchart showing reorganization of an execution job list table in the image formation apparatus concerning a second embodiment of the invention.

FIG. 11 is a flowchart showing reorganization of an execution job list table. Description will be given of a case where a priority change is collectively performed on a series of jobs in a link relationship with a job on which a priority change has been performed and an execution job list table is reorganized based on the changed priorities, using a flowchart of FIG. 11. In the flowchart, it is determined whether or not a change in an order of execution of a job from a job in the second place in the order of execution toward a job in a place later than the second place has occurred in an execution job list table to thereby reorganize the execution job list table. The flowchart includes the following steps of:

(a) first of all, designating a job in the second place in an order of execution as an organization job in the execution job list table (S41), (b) comparing a priority of a job in the immediately preceding place of the organization job in the order of execution with a priority of the organization job (S42) and going to step S46 if both are with the same priority or the priority of the organization job is lower, (c) determining whether or not a place of the organization job in the order of execution is the second place or a place other than the second place if, on the other hand, a priority of the organization job is high (S43) and going to step S44 if a place in the order of execution is the second place, while going to step S45 if a place in the order of execution is other than the second place, (d) determining whether or not the organization job is interruptable if a place in the order of execution of the organization job is the second place (S44), wherein, for example, if a job in the first place in the order of execution is already in printing, no interrupt can be done, and going to step S46 if no interrupt can be done (N), while going to step S45 if, on the other hand, interrupt can be done (Y), (e) interchanging the organization job with a job in the immediately preceding place of the organization job in the order of execution (S45) and thereafter, going to step S41, (f) determining whether or not a job in the next place of the organization job in the order of execution is present in a case where no interchange in the order of execution has been performed (S46), and going to step S47 if a job in the next place in the order of execution is present, while ending the job organization processing if no job in the next place is present, and (g) designating a job in the next place of the organization job in the order of execution as a new organization job (S47) and, thereafter, going back to step S42.

By performing all the steps described above, the execution job list table can be reorganized reflecting the priority change. Note that reorganization is performed on each of the execution job list table 18a of manuscript image data and the execution job list table 18b of synthetic image data.

Since an image formation apparatus and an image formation method of the invention can perform a priority change collectively on a series of jobs having a link therebetween accompanying a priority change on a job of performing image formation from one image data, the apparatus are useful as image formation apparatuses such as a printer connected to a network.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An image formation apparatus comprising:
   a job input unit which receives job inputs of performing image formation from image data;
   a job registration unit which registers the jobs of performing image formation from the image data together with priorities in an order of execution of the jobs and two or more kinds of selectable link information showing a link relationship between the jobs;
   a job management unit which manages the order of execution of the registered jobs;
   a job selection receiving unit which receives, via a graphical user interface a job selected by a user from the registered jobs;
   a priority change unit which changes a priority of the selected job; and
   a link information selection receiving unit which receives, via the graphical user interface, at least one kind of link information selected by the user,
   wherein the priority change unit determines the link information of the job received by the job selection receiving unit according to the kind of link information received by the link information selection receiving unit, and
   the priority change unit searches for other jobs having the same link information, which corresponds to the determined link information, from jobs registered in the job registration unit, and
   the priority change unit changes the priority of the searched jobs to the same priority of the job received by the job selection receiving unit.

2. The image formation apparatus according to claim 1, wherein the two or more kinds of selectable link information include user information identifying a user of the jobs.

3. The image formation apparatus according to claim 1, wherein the two or more kinds of selectable link information include image data information identifying image data of the jobs.

4. The image formation apparatus according to claim 1, wherein the two or more kinds of selectable link information include job link information showing a link between plural jobs.

5. The image formation apparatus according to claim 4, wherein the job link information is bind information concerning a bind output collectively performing image formation from plural image data.

6. The image formation apparatus according to claim 1, further comprising a rasterization processing unit rasterizing image data of the inputted jobs,
   wherein the job registration unit registers a job of image data in rasterization and the priority change unit performs a priority change of the job of image data in rasterization.

7. The image formation apparatus according to claim 1, wherein the job management unit reorganizes the order of execution of the registered jobs, after a priority change has been performed on a job and jobs in a link relationship with the job, based on priorities after the priority change.

8. The image formation apparatus according to claim 7, wherein the job management unit reorganizes the order of execution of jobs of performing image formation from image data except the image data in rasterization.

9. The image formation apparatus according to claim 1, wherein the jobs of performing image formation from image data are jobs of performing image formation from a synthetic image obtained by synthesizing manuscript image data and synthetic image data, the job link information is synthetic information from the manuscript image data and the synthetic image data, the job management unit includes a first job management unit managing an order of execution of jobs of the manuscript image data and a second management unit managing an order of execution of jobs of the synthetic image data, the priority change unit performs a priority change in response to a change request for priorities of jobs of the manuscript image data or the synthetic image data, and also changes priorities of jobs of the synthetic image data having synthetic information of, or the manuscript image data having, the same job link information as the job on which a priority change has been performed to the same priority as the job on which a priority change has been performed.

10. The image formation apparatus according to claim 1, wherein the image formation apparatus is connected to a network, and the job input unit receives job inputs of performing image formation from image data from a terminal connected to the network.

11. An image formation method comprising:
using a microprocessor coupled to a memory to:
receive job inputs of performing image formation from image data;
register the jobs of performing image formation from the image data together with priorities in an order of execution of the jobs and two or more kinds of selectable link information showing a link relationship between the jobs, wherein the link information is information which shows the attribute of a job which accompanies the job at the time of a job input;
manage the order of execution of the registered jobs;
receive via a graphical user interface a job selected by a user from the registered jobs;
change a priority of the selected job;
receive via a graphical user interface at least one kind of link information selected by a user;
determine the link information of the job received by the job selection receiving unit according to the kind of link information received by the link information selection receiving unit;
search for other jobs having the same link information, which corresponds to the determined link information, from jobs registered in the job registration unit; and
change the priority of the searched jobs to the same priority of the job received by the job selection receiving unit.

12. The image formation method according to claim 11, further comprising a step of reorganizing the order of execution of the registered jobs, after a priority change is performed on a job and jobs in a link relationship with the job, based on priorities after the priority change.

13. A non-transitory storage medium readable by a computer in which the image formation program for executing the steps according to claim 11 on a computer is stored.

* * * * *